Dec. 25, 1962  C. W. SPINKS ETAL  3,070,215
CARTON DIVERTING MECHANISM
Filed May 24, 1961
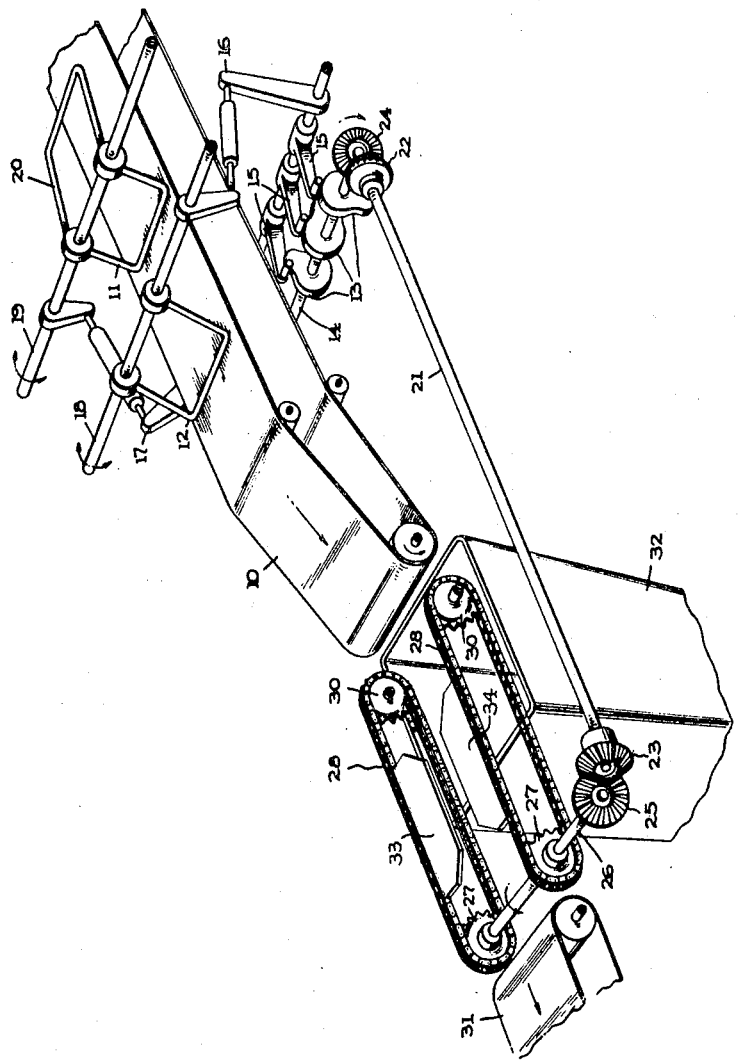
INVENTORS
Charles W. Spinks &
Donald A. Hunter
BY
Karl W. Flocks
ATTORNEY

United States Patent Office 3,070,215
Patented Dec. 25, 1962

3,070,215
CARTON DIVERTING MECHANISM
Charles W. Spinks, Chicopee Falls, Mass., and Donald A. Hunter, Gerber, Calif., assignors to Diamond National Corporation, New York, N.Y., a corporation of Delaware
Filed May 24, 1961, Ser. No. 112,398
1 Claim. (Cl. 198—102)

The present invention relates to the diverting of articles passing along a conveyor and more particularly to a mechanism for diverting some articles from an assembly line to a chute while other articles in the same assembly line continue to another conveyor belt.

This application is a continuation-in-part of co-pending application Serial No. 29,286, filed May 16, 1960.

With the new mechanism it is possible to convey a predetermined portion of the cargo on a conveyor belt to a point beyond its station while allowing the remainder to drop into a chute or hopper for routing to other lines.

Accordingly, the present invention is directed to a conveyor diverting system having stops for allowing the passage of articles, such as cartons, at timed intervals, as a means of determining alternate routing of articles carried on a conveyor belt.

Basically, the present invention provides a novel and improved means of diverting articles in an assembly line using two separate parallel belts attached to parallel endless chains acting as the carrier member on a conveyor and moving in timed relationship with arriving articles so that some articles pass to the next conveyor via said parallel belts, while the remainder drop down a chute or hopper.

A complete understanding of my invention may be had from the following description of a single embodiment of the invention taken together with the accompanying drawing wherein the sole FIGURE is a view of the interconnecting mechanisms and conveyor belts.

With particular reference now to the figure, a basic mechanical embodiment of the features of the present invention is shown in which conveyor belt 10 is used to move articles in the direction shown by the arrow thereon in a continuous flow. These articles (not shown) are carried by belt 10 until they reach the first stop 11. This stop as well as stop 12 retains its blocking position for an interval determined by the cams 13 mounted on cam shaft 14. Cams 13 position follower arms 15, thereby operating arm linkages 16 and 17 to rotate rods 18 and 19 respectively. The rotation of rods 18 and 19 operate the stops 12 and 11 respectively, releasing articles held by these stops. Back bar 20 of stop 11 coacts with stop 11 to take a blocking position against articles on the conveyor whenever stop 11 is raised for releasing articles, thereby permitting only one article to pass this stop at each instant of release. Stops 11 and 12 have a timed relationship but are not necessarily operated at the same time due to separate linkage systems 16 and 17. Connecting rod 21 has beveled gears 22 and 23 at its ends. Gear 22 meshes with a beveled gear 24 on cam shaft 14. Beveled gear 23 on the opposite end of connecting rod 21 meshes with another beveled gear 25 on shaft 26. Shaft 26 also has drive sprockets 27 so as to keep a pair of separate parallel belts 33 and 34 moving in timed relation to stops 11 and 12. Each of parallel belts 33 and 34 is mounted so that each one extends outward in a horizontal plane from one of the chains 28, adjacent to each other. Belts 33 and 34 may be of any material which will bend with the chains 28 around the drive sprockets 27 and idler sprockets 30 but still be rigid enough to support the weight of whatever articles it is contemplated to use with the apparatus depicted here. Also, other belt and drive mechanisms are available to be substituted for the sprockets and chains illustrated here. Articles which pass from conveyor 10 to belts 33 and 34 are then carried on to conveyor belt 31. If belts 33 and 34 are not adjacent to the end of conveyor 10 when an article reaches this point the article leaves the end of belt 10 and drops down chute 32. Therefore, it can be seen that it is completely a matter of timing that decides which path the articles will take. This timing is adjusted by means of cams 13 which determine the instant of release of articles by stops 11 and 12 allowing these articles to continue along conveyor belt 10 either onto belts 33 and 34 or into chute 32.

One of the more specific advantages of the apparatus resides in its simplicity of operation which lends itself to a variation of cargo entry timing settings without major overhaul. Furthermore, because of its rotary motion it tends to clear itself of foreign or improperly presented cargo without serious work stoppage.

A further advantage lies in the smooth uninterrupted manner with which this mechanism performs its task with no oscillating or intermittent motion.

A still further advantage lies in the design that permits an operator to remove all obstructions in the center of the conveyor. The operator may safely reach into a conveyor unit and remove cartons or clear jams without encountering a "guillotining effect" of a belting that extends the entire width of the conveyor.

It should be understood that the specific apparatus shown and described herein is intended to be representative only. Reference should therefore be made to the following claim in determining the full scope of the invention.

What is claimed is:

An apparatus for diverting articles comprising a first conveyor means for moving the articles toward the diverting mechanism, a second conveyor means for moving articles away from the diverting mechanism, a continuously operated third conveyor means including a pair of moving endless elements, and a pair of flexible platform segments spaced transversely and extending parallel to each other in the direction of travel, each of said platform segments being rigidly secured at one end to said endless elements and of a semi-rigid composition affording cantilever support for the articles carried thereon and of a flexibility affording up and down movements at points transversely spaced from their rigid connection to said endless elements and to provide for bending of said segments coordinated with the bending of said endless elements, said segments defining an upper reach alternately positionable between said first and second conveyor means for intermittently transporting articles therebetween and permitting other articles to descend through the path defined by said reach.

References Cited in the file of this patent
UNITED STATES PATENTS

| | | |
|---|---|---|
| 1,573,867 | Rondolin | Feb. 23, 1926 |
| 2,700,453 | Burbidge et al. | Jan. 25, 1955 |